United States Patent
Kuan

(10) Patent No.: US 6,302,014 B1
(45) Date of Patent: Oct. 16, 2001

(54) ROTARY FOOD PROCESSOR

(76) Inventor: Huo Feng Hsia Kuan, No. 32, Lane 2, Show-Gang Wu Street, Hsin-Tien, Taipei Hsien (TW)

( * ) Notice: Subject to any disclaimer, the term of this patent is extended or adjusted under 35 U.S.C. 154(b) by 0 days.

(21) Appl. No.: 09/841,111

(22) Filed: Apr. 25, 2001

(30) Foreign Application Priority Data

Apr. 10, 2001 (CH) .................................................. 01219293

(51) Int. Cl.$^7$ .............................. A23L 1/00; A23N 1/02; A47J 43/06; B02C 18/18; B02C 25/00
(52) U.S. Cl. ................................. 99/510; 99/495; 99/509; 241/37.5; 241/92; 241/169.1; 241/199.12; 241/282.1
(58) Field of Search ...................... 99/492, 495, 509–513, 99/623–631; 241/92, 93, 37.5, 68, 282.1, 282.2, 199.12, 101.2, 285.1, 280, 166, 169.1, 273.1, 273.2, 273.3, 278.1; 83/355, 356.3, 592, 326, 932, 423, 435.2; 426/112, 115, 124, 130; 366/314, 297, 279, 83–85

(56) References Cited

U.S. PATENT DOCUMENTS

| | | | |
|---|---|---|---|
| 4,198,887 | * | 4/1980 | Williams, Jr. ........................ 83/592 X |
| 4,227,655 | * | 10/1980 | Williams ................................ 241/92 |
| 4,277,995 | * | 7/1981 | Sontheimer ........................ 83/592 X |
| 4,283,979 | * | 8/1981 | Roakocy ............................ 241/92 X |
| 4,331,300 | * | 5/1982 | Hicks et al. ...................... 241/282.1 |
| 4,369,680 | * | 1/1983 | Williams ............................ 99/510 X |
| 4,393,737 | * | 7/1983 | Shibata ......................... 241/282.2 X |
| 4,448,100 | * | 5/1984 | Breeden ............................. 241/92 X |
| 4,700,901 | * | 10/1987 | McClean .......................... 241/282.1 |
| 4,706,896 | * | 11/1987 | Moon-Kau .......................... 241/37.5 |
| 4,768,429 | * | 9/1988 | Federighi ........................... 99/623 X |
| 4,840,119 | * | 6/1989 | Caldi ................................. 99/513 X |
| 5,435,237 | * | 7/1995 | Huang ................................... 99/510 |

* cited by examiner

Primary Examiner—Timothy F. Simone
(74) Attorney, Agent, or Firm—Dougherty & Troxell

(57) ABSTRACT

A rotary food processor comprises an upper lid, a rotary part, and a cutter part. As soon as the locking device in the cutter part is discharged and the turning knob assembly is rotated to make a selected flat surface or the cutters on any one of cutting surfaces on a tool carrier post pass through guide grooves and displace to an axial groove, a lock device is located in place and a treated food is placed between a press disk and a bottom plate in the cutter part to be moved on the bottom plate by the press disk while a handle knob is turned. When the treated food passes through said cutters, the treated food is cut a thrust with a depth and a width and then cut off by the cutters such that finished products with a desired width can fall down through an output slot on the bottom plate.

10 Claims, 3 Drawing Sheets

ROTARY FOOD PROCESSOR

BACKGROUND OF THE INVENTION

1. Field of The Invention

The present invention relates to a rotary food processor, and particularly to a food processor being possible to be operated manually for performing functions such as slicing, and shredding.

2. Description of Related Art

Vegetables and fruits have been vital food for us since very ancient age. Due to an increasing amount of income, more delicate cooked food or mixed vegetable and fruit salad is increasingly demanded. It is well known by family housekeepers and lovers of mixed vegetable and fruit salad that a vegetable or a fruit with tuberous or long shape such as potato, cucumber, carrot, and etc. being cut into slices and shreds is a very tedious job. In the mean time, a cut wound may often result from carelessness during processing the vegetable or the fruit. Hence, it is hard to do a good job for cutting the vegetable or the fruit delicately unless providing a skillful cutting experience. Furthermore, a good looking appearance of cut vegetable or fruit after being processed is greatly influenced by the experience of the person preparing the food, and it substantially influences the dining air and appetite.

In fact, the food processor can be classified into two categories and one is electrical mode and the other is manual mode, there is a common feature for both modes of the food processor that a single function is provided only. That is, one of functions, such as slicing, shredding, or grinding, is offered instead of all of the functions. Thus, various food processors with single function have to be bought and it causes not only an inconvenience for storing these food processors but also a waste of money.

Moreover, in order to control the thickness of each slice, it is necessary to prepare different cutters in the conventional food processor such that the thickness of each slice can be changed as desired by way of adjusting the location of each knife on the cutter. In order to control the width of each shred, it is necessary to replace another different cutter too in the conventional food processor such that the width of each shred can be changed as desired by way of different numbers of equidistant upright cutters being arranged on the cutting tool. Hence, it can be understood that a sophisticate procedure involved in replacing different cutters has to be performed repeatedly in the conventional food processor as soon as the thickness of each slice and the width of each shred are changed while the treated food is cut. Even more, it is very inconvenient that a storage space for so many cutters has to be offered in the conventional food processor in addition to the preparation of a variety of cutters.

Although the U.S. patent application Ser. No. 09/066,833 filed by the inventor on Sep. 13, 2000 has been allowed, the present inventor devotes himself to the improvement of food processor continuously and develops a rotary food processor disclosed hereinafter.

SUMMARY OF THE INVENTION

An object of the present invention is to provide a rotary food processor, which can cut a treated food into either slices or shreds easily and simply.

Another object of the present invention is to provide a rotary food processor, which offers a simplified structure to make cleaning job easy and complete.

A further object of the present invention is to provide a rotary food processor, which can be operated either outdoors or indoors conveniently.

A further object of the present invention is to provide a rotary food processor, which offers a container adaptable to a cutting part for receiving falling down finished product while a treated food is cut.

BRIEF DESCRIPTION OF THE DRAWINGS

Other objects and features of the present invention can be more fully understood by the following description and accompanying drawing, in which.

DETAILED DESCRIPTION OF THE PREFERRED EMBODIMENTS

Figure 1:
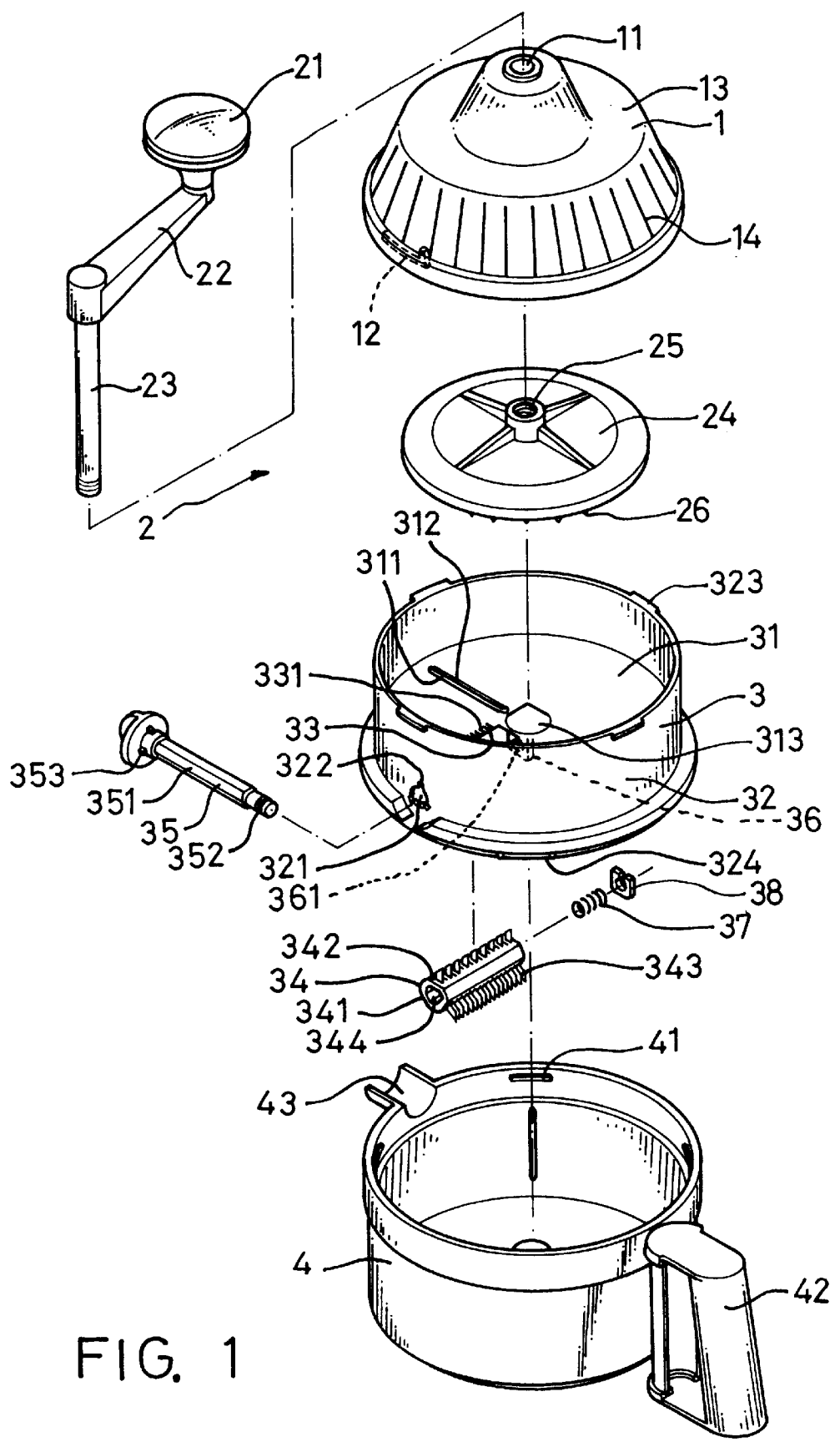
FIG. 1 is an exploded perspective view of rotary food processor according to the present invention.
Figure 2:
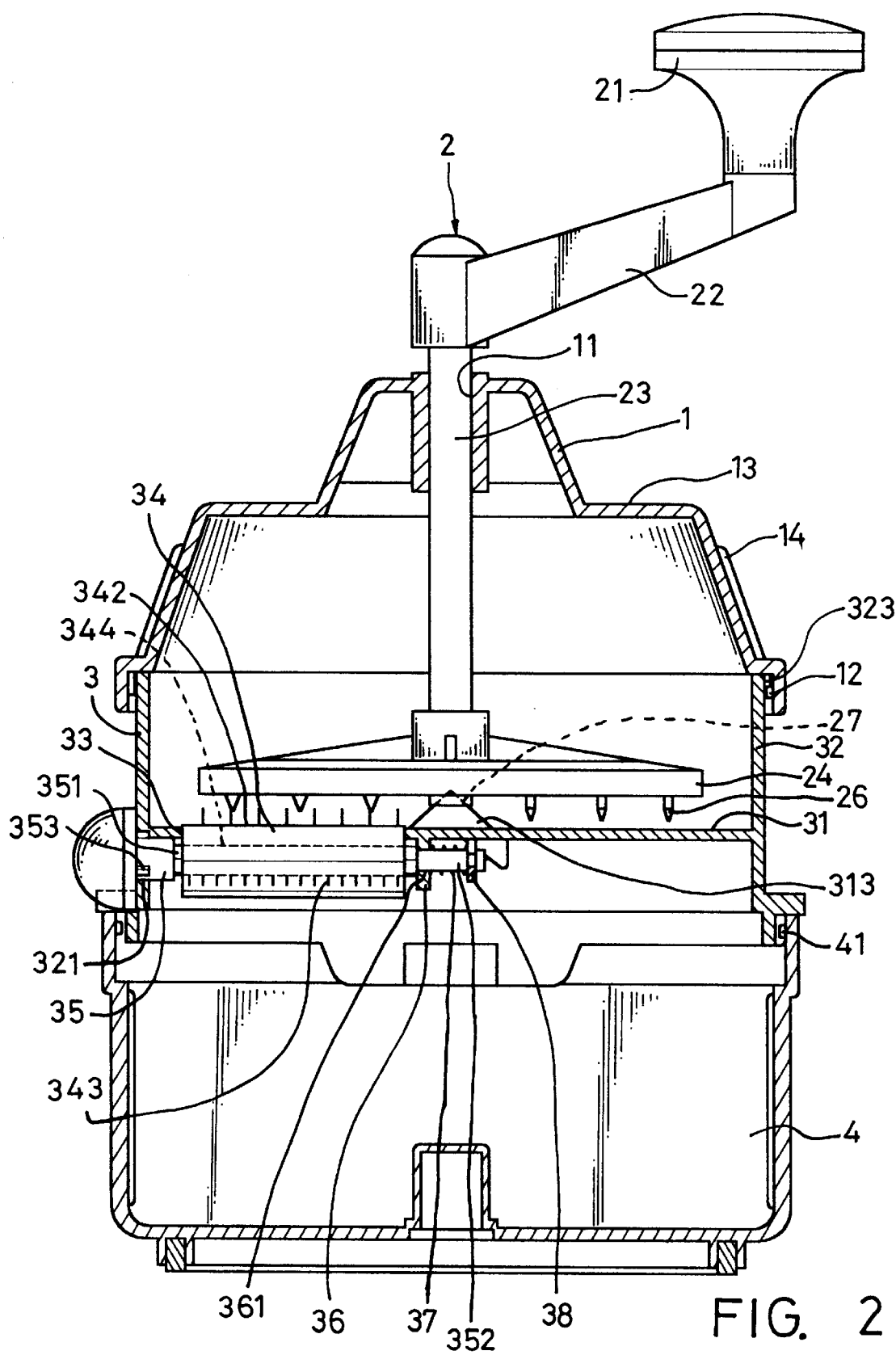
FIG. 2 is an assembled sectional view of rotary food processor shown in FIG. 1.
Figure 3:
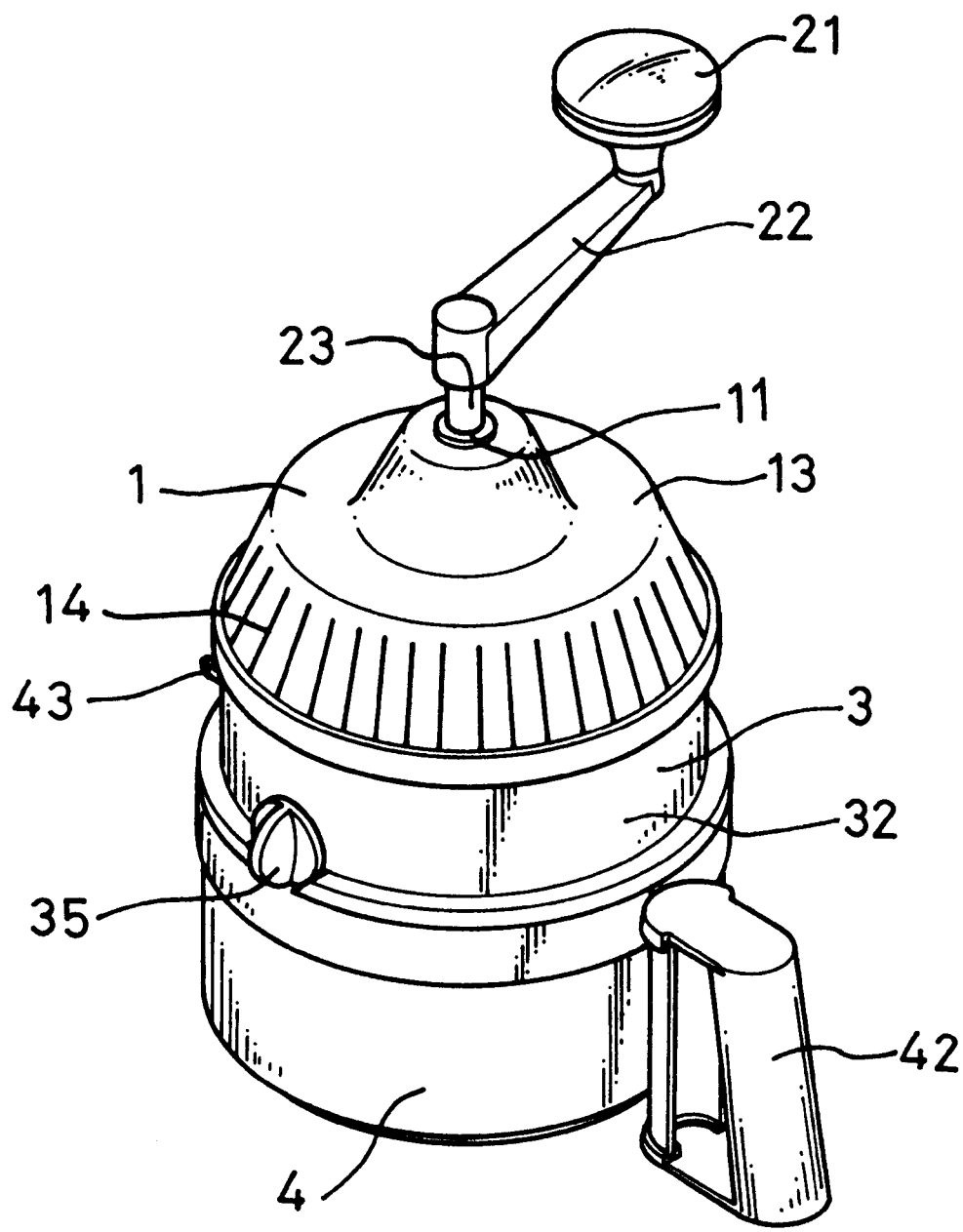
FIG. 3 is a perspective view illustrating an assembled rotary processor according to the present invention.

Referring to FIGS. 1 to 3, basically, the rotary food processor according to the present invention comprises an upper lid 1, a rotary part 2, and a cutter part 3.

Wherein, the upper lid 1 is a transparent covering with a top central hole 11 for being passed through by a spindle 23 of the rotary part 2. The upper lid 1 at a lower rim thereof provides a plurality of engaging devices 12 such as engaging recesses to join with the cutter part 3. Besides, the periphery surrounding the top central hole 11 may be arranged a lid step 13 for facilitating manual operation and a plurality of lid lines 14 surrounding the upper lid 1 below the lid step 13 to facilitate the user while pressing the lid step 13 for keeping the food processor in a state of steadiness during cutting. In addition, the lid lines 14 can increase the torque of the upper lid 1 such that it is possible for the upper lid 1 to engage with or disengage from the cutter part 3.

The rotary part 2 provides a handle knob 21 movably connects with an end of an extending rod 22 and the other end of the extending rod 22 extending vertically to constitute the spindle 23. The spindle 23 passes through the top central hole 11 and the other end thereof engages with a central disk hole 25 on a press disk 24 by way of threaded fastening or a tight fit. Hence, as soon as the handle knob 21 is forced to turn with the spindle 23, the press disk 24 at the other end of the spindle 23 rotates synchronously. In order to enhance the press disk joining to the treated food, the bottom thereof is provided with a plurality of cone or nail shaped sharp cone projections 26 so as to be thrust into the treated food for keeping the treated food in a state of steadiness during the process of cutting.

Furthermore, a cone shaped hole 27 is arranged below the disk hole 25 to avoid excess cutting and harm the sharp cone 26. That is, in case of the cone shaped hole 27 touching a projecting central cone 313 of the cutting part 3, it is not possible for the cutter part 3 to cut further.

The cutter part 3 is a box with a size and a configuration corresponding to the upper lid 1. A bottom plate 31 of the cutter part 3 has a radial output slot 311 and a cutter 312 is provided at the output slot 311 in an inclined position and an axial groove 33 is provided near any lateral position, preferably 90°, of the cutter 312. The axial groove 33 at both lateral sides thereof provides a plurality of equal spaced guide grooves 331 respectively. A tool carrier post 34 is disposed between a box wall 32 and a lower projection 36 located at the bottom of the axial groove 33. The tool carrier post 34 provides an equiangular flat surface 341 and at least a cutting surface 342, and preferably two cutting surfaces 342. The two cutting surfaces 342 provide a plurality of cutters 343 being arranged to correspond to the guide grooves 331 respectively or to space apart in an equal distance. Then, a turning knob assembly 35 has a stem part 351 passing through a locating hole 321 at the bottom of the box wall 32 and a through hole 344 in the tool carrier post 34 respectively, and an end 352 of the stem part 351 extends outward through a locating hole 361 in the lower projection 36 to engage with a lock piece 38 via piercing through a lock device such as a spring 37. The locating hole 321 at an end thereof corresponding to the knob part of the turning knob assembly 35 provides a plurality of equiangular spaced lock recesses 322 on the circumferential surface thereof based on the sum of the flat surfaces 311 and the cutting surfaces 312. The turning knob assembly 35 at the knob part thereof provides a plurality of projections 353 corresponding to the lock recesses 322.

Moreover, the box wall 32 at the upper rim thereof provides engaging devices 32 such as lock projections 323 to corresponding to the engaging devices 12 for the upper lid 1 engaging with the cutter part 3. Next, the box wall 32 at the bottom rim thereof provides a plurality of joining devices such as engaging recesses for joining to a container 4.

Referring to FIGS. 1 to 3 again, as soon as the treated food is ready for being cut into slices, the turning knob assembly 35 and the tool carrier post 34 are adjusted first to make the flat surface 341 be flush with the axial groove 33. Then, the treated food is placed on the bottom plate 31 after being cut to have a proper height and size to be pressed by the press disk 24 with the sharp cones 26 thrusting into the treated food. Afterward, the upper lid 1 is joined to the cutter part 3 and the cutter part 3 is disposed on a food container to complete the lead operation. Meanwhile, the user presses the lid step 13 with one of his hands, and then holds and rotates the handle knob 21 with the other hand in a way of the press disk 24 with the treated food rotating on the bottom plate 31 synchronously. As soon as the treated food passes by the flat surface 341 and touches the cutters 312, sliced pieces of food may fall down to the food container through the output slot 311. Hence, a continuous turning of the rotary part 2 may perform a process of slicing the treated food quickly.

In case of food shreds being cut, the lead operation of course has to be completed first. Then, the lock device is discharged, that is, the knob assembly 35 is pulled outward to disengage the projections 353 from the engaging recesses 322. At this time, the lock piece 38 is in a state of compressing the spring 37 such that the knob assembly 35 is turned to make the tool carrier post 34 rotate along with the stem part 351. When the cutters 343 which meet the desired cutting width pass through the guide grooves 331 and displace to the axial groove 33, the knob assembly 35 is loosened to make all the projections 35 engage with the engaging recess 322 in a state of locking. At this time, the user can rotate the rotary part 2 to have the treated food move along the bottom plate 31. When the treated food contacts the cutters 343, it may be cut into a semi-product with a certain depth, and the semi-product slides to the cutting surface 312 along with the press disk 24 so such that the semi-product can be cut off to complete the process of shred cutting.

In addition, as soon as the cone projection 313 at the central area of the bottom plate 31 in the cutter part 3 fits with the cone hole 27 at the bottom of the press disk 24, a safe height can be maintained to prevent the sharp cones 26 from damage due to touching the cutters 343 or the cutting surfaces 312 carelessly.

In fact, the food processor of present invention can be used for cutting an ice cake in addition to the vegetable and the fruit. The ice fragments obtained can be eaten directly or as decoration for a cold dish or as the material of freshness keeping.

Additionally, the food processor further comprises a transparent container 4 with an upper opening corresponding to the cutter part 3 and provides joining devices 41 such as engaging projections corresponding to the joining devices 324 for connecting with each other. Furthermore, the container 4 at the lateral side thereof extends outward a grip 42 and is arranged a extended lip 43 opposite to the grip 42 so that the juice from the cut product can be poured out. Thus, a baffle (not shown) can be provided on the cutting part 3 to correspond to the lip 43 as a closure for the lip 43.

It is appreciated that the rotary food processor of the present invention has the following advantages:

1) The rotary food processor of the present invention provides multiple uses and occupies less space. It is possible to perform functions including slicing, or shredding with a properly selected tool carrier post such that the defect of single use residing in the conventional food processor can be overcome completely.
2) It is easily cleaned while using the rotary food processor of the present invention. The present invention provides a simple structure without any dead corner so that it can be cleaned up simply by way of water. Hence, no dirty substance or food residue can stay in the rotary food processor for bacterium breeding to harm our body health.
3) The rotary food processor of the present invention is convenient in use. The present invention is not restricted by the power source so that it can be operated either indoors or outdoors easily. Thus, an endless pleasure can be enhanced during cooking or at meals.
4) The rotary food processor of present invention can assure the hygiene of food after cutting. The cutter part of present invention can be associated with a semi-closed container so that the food product and the ice fragments can be kept in the container without touching other articles in the kitchen to enhance the hygiene of foodstuff for eating.

While the invention has been described with reference to preferred embodiments thereof, it is to be understood that modifications or variations may be easily made without departing from the spirit of this invention, which is defined by the appended claims.

What is claimed is:

1. A rotary food processor, comprising
an upper lid, being a covering with a top central hole;
a rotary part, being a power source, further comprising a spindle with two ends, an end thereof connecting with a handle knob via an extended rod, the other end thereof passing through the top central hole, and a press disk with a central disk hole, the central disk hole connecting with the other end of the spindle to constitute a relationship of joining movement; and
a cutter part, being a box joined to the upper lid, having a bottom plate with a radial output slot, a cutter being provided at the output slot in an inclined position and an axial groove being provided near any lateral position of the cutter, the axial groove at both lateral sides thereof providing a plurality of equal spaced guide grooves respectively, a tool carrier post being disposed at the bottom of the axial groove, the tool carrier post providing an equiangular flat surface and at least a cutting surface, the cutting surface providing a plurality of cutters being arranged to correspond to the guide grooves respectively or to space apart in an equal distance, a turning knob assembly having a stem part passing through a locating hole at the bottom of the box wall and a through hole in the tool carrier post respectively to join the tool carrier post to a bottom of said box, and a lock device being arranged between the turning knob assembly and the box;

whereby, as soon as the lock device is discharged and the turning knob assembly is rotated to make the selected flat surface or the cutters on any one of the cutting surfaces pass through the guide grooves and displace to the axial groove, the lock device is located in place and a treated food is placed between the press disk and the bottom plate to be moved on the bottom plate by the press disk while the handle knob is turned; and when the treated food passes through said cutters, the treated food is cut a thrust with a depth and a width and then cut off by the cutters such that finished products with a desired width can fall down through the output slot.

2. The rotary food processor as defined in claim 1, wherein the locking device is a turning knob assembly with a stem part passing through a locating hole at the bottom of the box wall and a through hole in the tool carrier post and a locating hole in the lower projection at bottom of the box piercing through a spring to join a lock piece; a locating hole at another end thereof corresponding provides a plurality of equiangular spaced lock recesses on the circumferential surface thereof based on the sum of the flat surface and the cutting surfaces, and the turning knob assembly at an inner wall thereof provides a plurality of projections corresponding to the lock recesses; as soon as the turning knob assembly is pulled outward, the lock piece compresses the spring to separate the projections from the lock recesses so as to release the state of locking.

3. The rotary food processor as defined in claim 1, wherein the upper lid at a lower rim thereof provides a plurality of engaging devices corresponding to a plurality of engaging devices at an upper rim of the box wall on the cutter part for the upper lid joining to the cutter part.

4. The rotary food processor as defined in claim 1, wherein the upper lid at a periphery thereof provides a lid step and a plurality of lid lines are provided on the upper lid below the lid step.

5. The rotary food processor as defined in claim 1, wherein the press disk at a bottom thereof provides a plurality of sharp cones and each of the sharp cones has a shape of cone or nail.

6. The rotary food processor as defined in claim 1, wherein the cutting operation is unable to proceed as soon as a cone shaped hole provided under the bottom of the press disk fits with a central cone projection provided on the bottom plate of the cutting part.

7. The rotary food processor as defined in claim 1, further comprises a container with a connection device at an upper rim thereof to engage with a joining device on the cutter part for receiving the finished product falling down from the cutting part.

8. The rotary food processor as defined in claim 7, wherein the container at a lateral side thereof extends outward a grip 42 and a lip, and the lip is disposed opposite to the grip.

9. The rotary food processor as defined in claim 1, wherein the upper lid is preferably transparent.

10. The rotary food processor as defined in claim 6, wherein the container is preferably transparent.

\* \* \* \* \*